United States Patent Office 3,240,790
Patented Mar. 15, 1966

3,240,790
CATALYTIC PROCESS FOR THE PREPARATION OF 2,3-DIHYDROPYRAN FROM TETRAHYDROFURFURYL ALCOHOL
William I. Denton, Cheshire, Conn., assignor to Olin Mathieson Chemical Corporation, a corporation of Virginia
No Drawing. Filed Jan. 16, 1963, Ser. No. 251,732
2 Claims. (Cl. 260—345.1)

This invention relates to a method for the preparation of 2,3-dihydropyran from tetrahydrofurfuryl alcohol. More particularly, this invention relates to a novel catalytic process for the preparation of 2,3-dihydropyran from tetrahydrofurfuryl alcohol.

It is known in the art that 2,3-dihydropyran can be prepared by passing tetrahydrofurfuryl alcohol in the vapor phase over an alumina catalyst at a temperature of about 375° C. and that a 42 percent yield of 2,3-dihydropyran can be obtained. Similar results have been obtained when the same process have been carried out in the presence of a thoria catalyst. In U.S. Patent 2,365,623 there is described a process for the production of 2,3-dihydropyran in which tetrahydrofurfuryl alcohol in the vapor phase is subjected to the action of a catalyst which consists essentially of a coprecipitated mixture of alumina and aluminum phosphate (referred to as basic aluminum phosphate) at a temperature between 200° C. and 500° C. In this process, the yield of 2,3-dihydropyran was 65 percent.

In the process of this invention it has been found that tetrahydrofurfuryl alcohol can be converted to 2,3-dihydropyran in excess of 75 percent yield by contacting the tetrahydrofurfuryl alcohol in the vapor phase with a molybdena catalyst.

In the process of this invention the temperature of the reaction can be varied widely from about 250° to 425° C. with the preferred temperature range being from 320° C. to 400° C. Residence time is not a critical factor in the process of this invention. Residence times of from 2 to 20 seconds are suitable although the preferred residence time is from about 2 to 10 seconds.

Although the reaction is conveniently carried out at atmospheric or slightly above atmospheric pressure, higher pressures can be employed and, in addition, sub-atmospheric pressures may be utilized if desired.

The process of this invention can be conveniently carried out in a continuous manner. Vaporized tetrahydrofurfuryl alcohol can be passed through a heated reaction zone where it is contacted with the molybdena catalyst and maintained at the desired temperature. The resulting reaction product mixture is then passed through a condenser and the condensate thus formed is distilled to separate the 2,3-dihydropyran product from the unreacted alcohol which can be returned to the reaction zone for further processing. If desired, the tetrahydrofurfuryl alcohol, in vapor form, can be passed into the reaction zone entrained in an inert carrier gas such as nitrogen or any other gas inert to the reaction. After condensation of the product vapors from the reactor exit stream, the inert carrier gas can be recycled to the process.

The catalyst which is employed is a molybdena catalyst. Ordinarily the catalyst is molybdenum trioxide although the lower oxides of molybdenum are also effective. A wide variety of catalyst supports such as alumina or bauxite, in activated or unactivated form, can be utilized. The percentage by weight of the molybdenum oxide can be varied from about 2 percent to about 30 percent based on the total weight of the oxide and the support with the preferred amount of molybdenum oxide being from about 5 percent to about 15 percent by weight based on the total weight of the oxide and the support catalyst.

The invention is mare fully illustrated by the following examples. It is to be understood, however, that these examples are for the purpose of illustration and are not to be considered as limiting in any way the scope of this invention.

EXAMPLE I

Preparation of catalyst

A catalyst consisting of 10 percent by weight of molybdenum trioxide ($MoO_3$), based on the total weight of the catalyst, on 4–8 mesh activated alumina was prepared as follows:

500 grams of 4–8 mesh, activated alumina, was placed in a one liter filter flask. A vacuum pump was connected to the side arm of the filter flask through a three-way stopcock and a 300 cc. dropping funnel was attached to the top of the flask through a rubber stopper. The flask containing the activated alumina was evacuated for at least one hour. A solution of ammonium molybdate, prepared by dissolving 0.08 mole of ammonium molybdate in 45 cc. of ammonium hydroxide and 200 cc. of distilled water, was added to the dropping funnel, and the filter flask contents were isolated under vacuum by turning off the three-way stopcock. The ammonium molybdate solution was then added to the alumina in small portions with shaking after each addition in order to distribute the liquid evenly. After the molybdate solution had been added, the mixture was allowed to stand for 30 minutes with occasional shaking. Excess liquid was then filtered off and the catalyst was dried in an oven at 135° C. for 16 hours followed by heating in a muffle furnace for 16 hours at 450° C.

Preparation of 2,3-dihydropyran

Tetrahydrofurfuryl alcohol and nitrogen in a ratio of 1 mole of tetrahydrofurfuryl alcohol to 1.7 moles of nitrogen were passed at atmospheric pressure over the catalyst prepared as described above at a temperature of 367° C. and at a rate of 1.1 volumes of tetrahydrofurfuryl alcohol per hour per volume of catalyst. During the 3.0 hour experiment a total of 421 grams of tetrahydrofurfuryl alcohol was passed over the catalyst. The residence time calculated for the rate of flow maintained in this experiment was 2.1 seconds. Reactor gases leaving the reactor were passed through a condenser and there was recovered 402 grams of liquid product. Analysis of the product showed that 74 percent of the tetrahydrofurfuryl alcohol charged had been converted to 2,3-dihydropyran. The dihydropyran product had a boiling point of 85° C., a density of $D_{60}^{60}=0.923$ and a refractive index of 1.4392.

EXAMPLE II

Tetrahydrofurfuryl alcohol was passed at atmospheric pressure over a catalyst prepared as described in Example I at a temperature of 300° C. and at a rate of 1.85 volumes of tetrahydrofurfuryl alcohol per volume of catalyst which corresponds to the residence time of about 4 seconds. During the 2 hour run a total of 464 grams of tetrahydrofurfuryl alcohol was passed over the catalyst. The condensed liquid product was collected and it was shown by analysis that the yield of 2,3-dihydropyran was 69 mole percent based on the tetrahydrofurfuryl alcohol charged to the reactor.

EXAMPLE III

Tetrahydrofurfuryl alcohol and nitrogen in a ratio of 1 mole of alcohol to 4 moles of nitrogen were passed over a portion of molybdena catalyst prepared as described in Example I at a temperature of 333° C. and at a rate of 0.5 volume of tetrahydrofurfuryl alcohol per hour per volume of catalyst which corresponds to a residence time of about 2.8 seconds. A total of 260 grams of alcohol was passed over the catalyst during the run. The product obtained by passing the reaction mixture through a condenser was analyzed and it was found that the yield of 2,3-dihydropyran was 75 moles percent on the alcohol charged to the reactor.

EXAMPLE IV

In this experiment tetrahydrofurfuryl alcohol (349 grams) and nitrogen in a ratio of 1 mole of alcohol to 3.9 moles of nitrogen were passed at atmospheric pressure over a catalyst, prepared as described in Example I, at a temperature of 400° C. and at a rate of 1.0 volume of alcohol per hour per volume of catalyst which corresponds to a residence time of 1.3 seconds. The yield of 2,3-dihydropyran was 56 mole percent based on the tetrohydrofurfuryl alcohol.

EXAMPLE V

At a temperature of 400° C. and at atmospheric pressure tetrahydrofurfuryl alcohol (224 grams) and nitrogen in a ratio of 1 mole of alcohol to 3.3 moles of nitrogen were passed over a catalyst made by the process set forth in Example I at a rate of 0.3 volume of alcohol per hour per volume of catalyst which corresponds to a residence time of 5.8 seconds. The yield of 2,3-dihydropyran obtained was 76 mole percent based on the alcohol charged to the reactor.

EXAMPLE VI

Tetrahydrofurfuryl alcohol was passed at atmospheric pressure over a catalyst prepared as described in Example I at a temperature of 333° C. and at a rate of 0.86 volume of alcohol per hour per volume of catalyst which corresponds to a residence time of 8.2 seconds. During the 3 hour run a total of 325 grams of tetrahydrofurfuryl alcohol was introduced into the reactor. Liquid prouct in the amount of 306 grams was recovered and by analysis it was determined that the yield of 2,3-dihydropyran was 72 mole percent based on the alcohol charged.

What is claimed is:
1. A method for the preparation of 2,3-dihydropyran which comprises contacting tetrahydrofurfuryl alcohol in the vapor phase at a temperature of from about 250° C. to about 425° C. with a catalyst consisting essentially of molybdenum trioxide on an inert solid support, the amount of the said oxide being from about 2 percent to about 30 percent based on the combined weight of the oxide and the support.

2. The method for the preparation of 2,3-dihydropyran which comprises contacting tetrahydrofurfuryl alcohol in the vapor phase at a temperature of from about 250° C. to about 425° C. with a catalyst consisting essentially of molybdenum trioxide on an activated alumina support, the amount of the said oxide being from about 2 percent to about 30 percent based on the combined weight of the trioxide and the support.

References Cited by the Examiner
UNITED STATES PATENTS

| | | | |
|---|---|---|---|
| 2,365,623 | 12/1944 | Bremner et al. | 260—345.1 |
| 2,513,133 | 6/1950 | Hatch et al. | 260—345.9 |
| 2,680,118 | 6/1954 | Emerson et al. | 260—345.9 X |
| 2,976,299 | 3/1961 | Manly | 260—345.1 |
| 3,056,788 | 10/1962 | Brader | 260—268 |

FOREIGN PATENTS 161,088  2/1955  Australia.

OTHER REFERENCES

Elderfield: Heterocyclic Compounds, vol. I, pages 348–349, John Wiley & Sons, Inc., New York (1950).

Sabatier: Catalysis in Organic Chemistry, Second Edition, page 240, entry No. 675, D. Van Nostrand Co., New York (1923).

IRVING MARCUS, *Primary Examiner.*

JOHN D. RANDOLPH, WALTER A. MODANCE,
*Examiners.*